United States Patent [19]

Betts

[11] 4,059,735

[45] Nov. 22, 1977

[54] DIGITAL CONFERENCE SYSTEM

[75] Inventor: William L. Betts, St. Petersburg, Fla.

[73] Assignee: NCR Corporation, Dayton, Ohio

[21] Appl. No.: 742,978

[22] Filed: Nov. 18, 1976

[51] Int. Cl.$^2$ .............................................. H04M 3/56
[52] U.S. Cl. ................................................ 179/18 BC
[58] Field of Search .................................... 179/18 BC

[56] References Cited

U.S. PATENT DOCUMENTS

| 3,882,280 | 5/1975 | Goutmann | 179/18 BC X |
| 4,000,377 | 12/1976 | Sharret | 179/18 BC |

Primary Examiner—William C. Cooper
Attorney, Agent, or Firm—J. T. Cavender; Edward Dugas

[57] ABSTRACT

Conference conversations are provided among selected groups of stations in a communications system. Each of a plurality of stations generates speaker signals and conference control signals and responds to a designated listener address signal in order to receive selected elements of a listener output signal from a central processor. A programmable list processor responds to the conference control signals and generates memory address signals and control signals. A random access memory sequentially stores and periodically updates samples of the digital speaker signals and generates a series of listener output pulses in response to the memory address signals. An accumulator additively stores selected groups of listener output pulses and upon receiving an appropriate control signal generates a listener output signal. A listener address circuit also responds to the control signal and generates the listener address signal.

14 Claims, 5 Drawing Figures fig. 1 fig. 2

DIGITAL CONFERENCE SYSTEM

BACKGROUND OF THE INVENTION

This invention relates to sampled data systems, and, more particularly, to digital conference systems for providing intercommunication between selected stations.

One of the major problems with prior art intercommunications systems is that they are primarily designed to communicate between only a single pair of stations. Typically, these intercom systems have a very limited conferencing capability wherein a single conference can be maintained between a very limited number of stations within the system. Once this single conference is in progress, no other conferences can be conducted until the conferencing circuitry is relinquished by the first group.

A few prior art intercom systems are designed to handle conferences. These systems are typically analog rather than digital designs. One type of prior art analog conference system requires that a very large number of cables be routed from each remote station. The main element of this system is a sophisticated rotary switch. This system has a number of disadvantages in addition to its extreme complexity and high cost. First, it is very easy to monitor so that an unauthorized party could gain access to sensitive conversations. Second, there are problems of crosstalk between various users involved in separate conferences. Furthermore, adapting a voice scrambler circuit to this prior art conferencing system to eliminate security risks is a complex and costly undertaking. In addition, since this is an analog system it requires periodic adjustment and alignment and it cannot be fabricated by using large scale integrated circuit techniques.

Other forms of prior art conference systems require highly sophisticated intercom stations, each one of which serves essentially as a decentralized data processor to separate out the desired incoming data and properly encode the outgoing data. These remote intercom stations are highly complicated and the possibility of a failure or breakdown is thereby increased.

Another disadvantage of prior art conferencing systems is that because of the size and complexity of the intercom stations and because of the great amount of cabling between the intercom stations and the central switching station, the weight of the entire system is substantial. For airborne applications where weight is a highly significant factor and where the space required for complex cabling arrangements is extremely limited, use of this type of system is virtually precluded.

An additional drawback of the prior art conferencing systems which is particularly acute in airborne installations is the lack of a braodcast mode wherein someone (such as the pilot) can broadcast emergency instructions or other high priority information to every intercom station simultaneously. This feature is particularly necessary for airborne installations, but is also highly desirable in other ground-based installations. An additional feature which many prior art conferencing systems have not been able to conveniently provide is the ability to have a single listener simultaneously monitor all other system conversations. Furthermore, it is highly desirable to have a conferencing system which can call up preprogrammed nets so that certain operators can enter into frequently used conference networks without having to individually dial up each station with which he wishes to confer.

SUMMARY OF THE INVENTION

It is the principal object of the present invention to provide a lightweight, relatively inexpensive digital conference system which has the capacity to accommodate numerous conferences between various groups of intercom stations.

Another object of the present invention is to provide a digital conference system which utilizes remote intercom stations having only a few, relatively unsophisticated components and a centrally located processor which contains all of the sophisticated components of the system.

A further object of the present invention is to provide a digital conference system which requires an absolute minimum number of data cables to transmit data back and forth between each of the intercom stations and the central processor.

Yet another object of the present invention is to provide a digital conference system which is highly reliable and very light in weight.

Still another object of the present invention is to provide a digital conference system which has a broadcast mode.

A further object of the present invention is to provide a digital conference system which is insensitive to crosstalk and which is highly secure.

A yet further object of the present invention is to provide a digital conference system which can be fully implemented through the use of large scale integrated circuit techniques.

A still further object of the present invention is to provide a digital conference system which allows an intercom station involved in a preselected conference to monitor other intercom stations without communicating with those other intercom stations.

Still another object of the present invention is to provide a digital conference system in which the listener at an intercom station can selectively attenuate the incoming signals from each of the other intercom stations which he is monitoring.

These and other objects of the present invention will become apparent to those skilled in the art as the description thereof proceeds.

Briefly stated and in accord with one embodiment of the invention, a digital conference system permits conference conversations among selected groups of stations in a communications system. The conference system includes a plurality of stations, each of which generates a speaker signal and conference control signal. Each station is enabled by a listener address signal to receive selected elements of a listener output signal. A programmable list processor is responsive to the conference control signals and generates memory address signals and control signals. A random access memory sequentially stores and periodically updates samples of the speaker signal. The random access memory is responsive to the memory address signals and generates a series of listener output pulses. An accumulator selectively stores groups of listener output pulses and upon receiving a control signal generates a single listener output signal. A listener address means is also responsive to the control signal and generates listener address signals, whereby the selected elements of the digital output signal received by each station are representative of the desired conference conversation to be heard at each station.

DESCRIPTION OF THE DRAWINGS

This invention is pointed out with particularity in the appended claims. However, other objects and advantages, together with the operation of the invention may be better understood by reference to the following detailed description taken in conjunction with the following illustrations wherein:

DESCRIPTION OF THE PREFERRED EMBODIMENT

In order to better illustrate the advantages of the invention and its contribution to the art, a preferred hardware embodiment of the invention will now be described in some detail.

Figure 1:
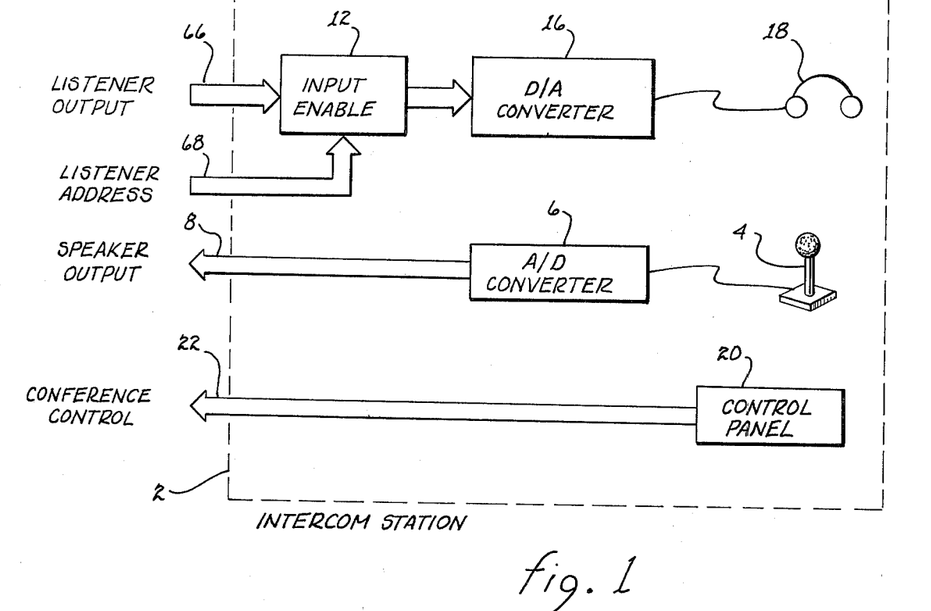
FIG. 1 is a block diagram representation of a typical intercom station of the digital conference system of the present invention.

The structure and operation of the invention will be first described with reference to FIG. 1. FIG. 1 illustrates a typical intercom station 2. A station operator speaks into microphone 4 which is coupled to analog to digital converter (A/D converter) 6 which converts his speech into a digital signal which is referred to as a speaker output signal and which is connected to the remainder of the digital conference system by speaker output cable 8. Speaker output cable 8 is designed to have a 12-bit capacity to correspond with the range of output levels from A/D converter 6. A 12-bit listener output signal is coupled to intercom station 2 by 12-bit listener output cable 66 which is coupled to an input enable circuit 12. A 5-bit listener address signal is coupled to a second input of input enable circuit 12 by listener address cable 68. When input enable circuit 12 receives the proper listener address signal, the listener output signal on listener output cable 66 is coupled to digital to analog converter (D/A converter) 16 which converts this 12-bit listener output signal into an analog signal which can be heard by the station operator over headset 18.

Intercom station 2 also includes a control panel 20. Control panel 20 can be either a rotary dial or a push-button digital signal generator. Control panel 20 generates a conference control signal which is transmitted from intercom station 2 over conference control cable 22. Control panel 20 is used to designate the other intercom stations in the system which are to be included within a certain conference, the desired attenuation or volume level for each signal which will be received by intercom station 2, and also serves to select any of a group of predetermined stations or nets which are preprogrammed into the digital conference system.

The particular embodiment of the digital conference system which will be described contains 32 different intercom stations. Intercom station 2 as illustrated in FIG. 1 is representative of one possible configuration. Virtually any source of an audio signal can be used to generate a speaker output signal. It should be clear that the format of the intercom station signals is unimportant to the particular embodiment of the digital conference system choosen for descriptive purposes. For economy of system wiring, a single cable with multiplexed listener output, listener address, speaker output and conference control signals is preferred. For D/A and A/D conversion a delta modulation format in combination with a digital code converter similar to that disclosed in my co-pending application entitled "Digital Code Converter", Ser. No. 647,390, is preferred One alternative audio source for an intercom station would be a radio receiver or a tape recorder which could be used to generate an analog speaker output signal for connection to A/D converter 6. Additionally, although only one embodiment having a capacity of 32 different intercom stations will be described, it is possible using present techniques to have a system capacity of up to 200 different intercom stations connected within the same digital conference system. With future advances in the state of the art, further increases in system capacity can be readily implemented using exactly the same techniques which will be described below.

This digital conference system operates as a sampled data system. Since this system is primarily intended as a voice intercommunication system and since an upper frequency response of 4000 Hertz is sufficient to ensure the desired degree of intelligibility, the Nyquist criterion tells us that a sampling rate of 8000 samples per second is sufficient to ensure an adequate level of audio quality. An 8000 Hertz sample rate is equivalent to taking a single sample from a single audio signal once every 125 microseconds.

Figure 2:
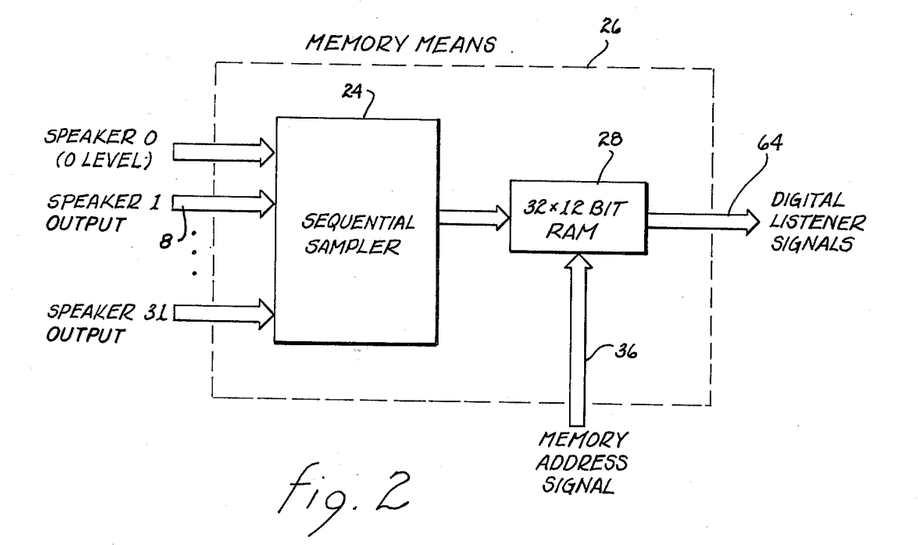
FIG. 2 is a generalized block diagram showing the memory means of the present invention.

Referring now to FIG. 2, each of the speaker output cables 8 from each intercom station is routed to a sequential sampler 24 which is an element of memory means 26. The inputs to sequential sampler 24 are labeled speaker 0, speaker 1, ..., speaker 31. The speaker 0 input cable is used to set a digital reference level equivalent to a zero level input signal. This reduces the capacity of the digital conference system from 32 intercom stations to 31. Sequential sampler 24 samples each of the 32 input lines one time during each 125 microsecond interval. For the present system with a $2^5$ station capacity, this necessitates taking a sample from the digital signal present on each speaker output cable once each 125/32 microseconds or about once each four microseconds. For a system capacity of 125 intercom stations, a sample from each speaker output cable would be taken once each microsecond (125 microseconds/125 speaker output cables = 1 microsecond).

Sequential sampler 24 sequentially loads the sequential speaker samples into a 32 × 12-bit random access memory (RAM) 28 in such a manner that the digital amplitude from speaker 0 (the reference level) is loaded into the 0 address position of RAM 28, while the digital amplitude from speaker 31 is loaded into address position 31 in RAM 28. Whenever a new speaker sample is loaded into a designated address in RAM 28, the previously stored speaker sample is erased and the newly sampled speaker sample is read into the RAM. The contents of RAM 28 are sequentially updated and the entire content of RAM 28 is updated once during each 125 microsecond sampling interval. In this manner no speaker output sample will have been stored in RAM 28 longer than a single 125 microsecond sampling interval and the system audio quality requirement is thus assured.

Figure 3:
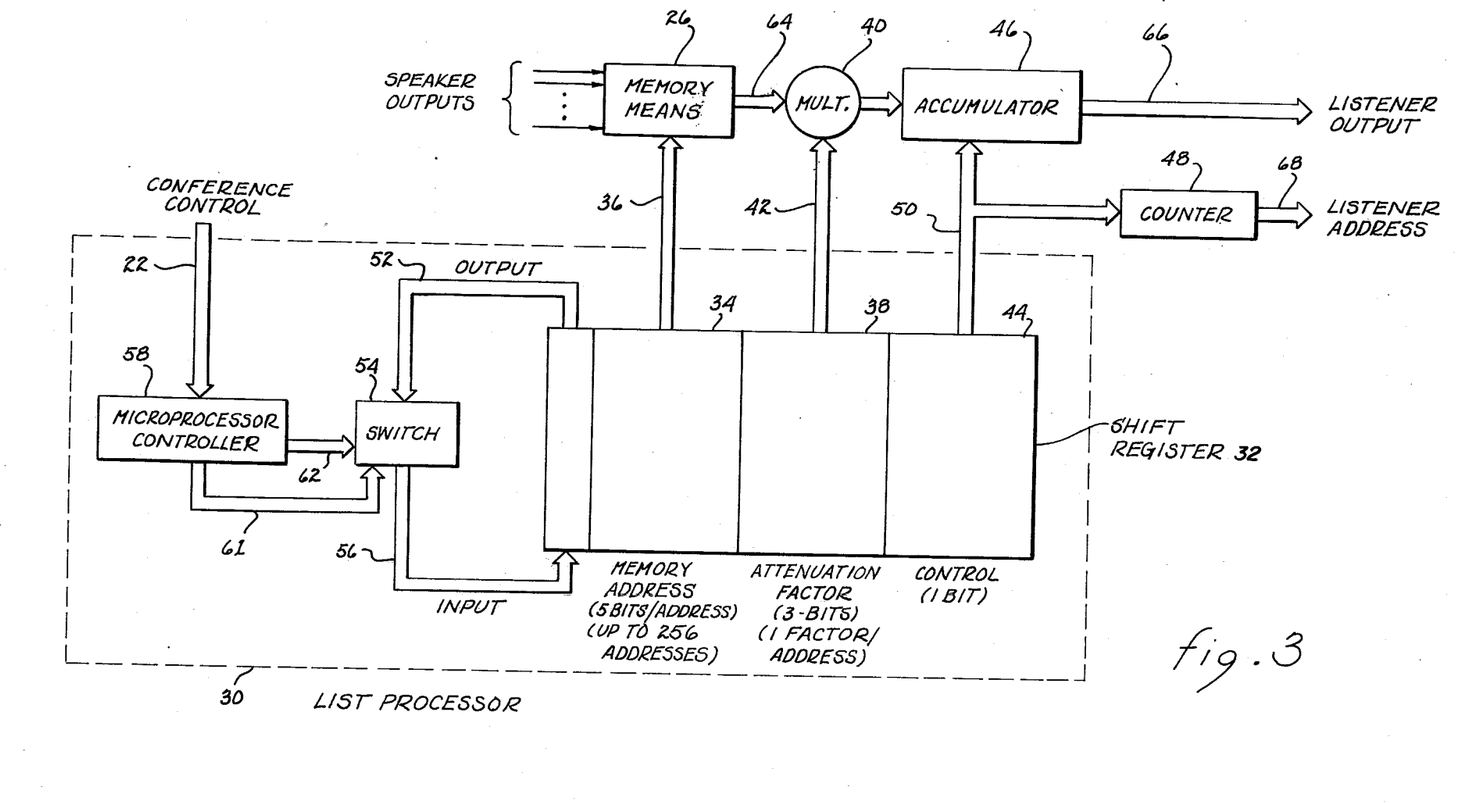
FIG. 3 is a generalized block diagram of the central processor of the digital conference system of the present invention.

Referring to FIG. 3, the primary central element of the digital conference system is a list processor 30. List processor 30 contains shift register 32 which has a capacity of 9 single bit fields and a length of 256 storage positions or storage bins in each field. This type of recirculating shift register is well known in the art and is commercially available. It can be constructed using combinations of smaller devices such as the Texas Instruments TMS-3417. Alternatively, combinations of random access memory integrated circuits may be used if they are available at lower cost.

The first five fields (group 34) of shift register 32 generate a 5-bit memory address signal which is coupled by 5-bit cable 36 to RAM 28 (FIG. 2) in memory means 26.

The next three fields (group 38) of shift register 32 contains a 3-bit attenuation signal which is coupled to multiplier 40 by a 3-bit cable 42 for providing one of eight possible attenuation levels. The multiplier 40 may be implemented using a set of integrated circuit binary multipliers such as the Fairchild 93S43 devices. Alternatively, for rough 6db attenuation factors, the multiplier may be implemented as a simple shifting operation. An arithmetic shift right is equivalent to a 6db attenuation and an 8-bit shift results in a 48db attenuation. The final single bit field (group 44) contains the control bit or control signal which is coupled to an accumulator 46 and to a counter 48 by single bit cable 50.

Field groups 34, 38 and 44 are shifted in synchronization and a complete circulation of all 256 storage positions in each of these field groups is completed during each 125 microsecond sampling interval.

As is common in all recirculating shift regulators, the output signals on conductors 36, 42, and 50 are also recirculated back to the input of the shift register through the path indicated by output conductor 52, switch 54 and input conductor 56. Switch 54 is oriented so that normally the digital signals transmitted through output conductor 52 are coupled straight through switch 54 directly to input conductor 56. However, when new conference control commands are sent over conductor 22 to a digital controller such as microprocessor controller 58, the contents of all of the fields of shift register 32 must be rearranged in accordance with the newly received conference control command. This restructuring is accomplished by a microprocessor controller such as the Intel 8080. Upon receiving a conference control signal, microprocessor controller 58 commands switch 54 to discard the shift register 32 output data arriving via output conductor 52. As the controller restructures the contents of shift register 32, this restructured data is routed to switch 54 via conductor 62 and then back to the input of the shift register over input conductor 56. As soon as this restructuring is completed, switch 54 switches back to its normal condition and the contents of shift register 32 are recirculated in the normal manner.

Microprocessor 58 could be designed to supply control signals 36, 42 and 50 directly without the use of shift register 32, but this arrangement has the disadvantage of being substantially slower and would limit the conference capacity. Since the control operation of the digital conference system is highly repetitive, it is ideally suited to high speed recirculating shift registers or equivalent memory devices. Shift register 32 removes the processing speed limitations of microprocessor controller 58 from the digital conference system.

The operation of the digital conference system can be best explained by using an actual example and by simultaneous reference to FIGS. 1, 2, 3, and 4. Assume that a group of users each located at a station, such as that shown in FIG. 1, desire to initiate a conference. Assume further that the users are located at stations designated as station numbers 4, 7, 10, and 14, respectively. The user at station 4 inserts through a ten-digit push button control panel a group of digital input commands corresponding first to the desired parties to whom he wishes to listen and second the attenuation factor or volume level of each party he wishes to hear. Each of the users can select any combination of other stations and any one of the 8 possible attenuation levels from level 1 through level 8. For instance, user 4 might first insert the digits 7-5. This would indicate that station 4 desires to hear station 7 at level 5. Station 4 could then insert 10-8 and 14-2, indicating that he desired to listen to station 10 at the maximum level 8, perhaps because station 10 speaks in a very low voice, and that he desires to hear station 14 at level 2 since he knows that speaker 4 commonly speaks quite loudly. The control panel instructions which have just been described will then allow station 4 to listen to stations 7, 10 and 14. Each of the other stations 7, 10, and 14 may now dial up on its control panel 20 each of the other three stations and the appropriate attenuation factor for each station.

The control sequence just described would cause the microprocessor to build an address list which would allow station 4 to listen to the combined speech signals from stations 7, 10 and 14. Under a conventional dialing protocol, microprocessor 58 will automatically build additional address lists which would allow station 7 to listen to stations 4, 10 and 14; station 10 to listen to stations 4, 7 and 14; and station 14 to listen to stations 4, 7 and 10. Additionally, unlike a conventional conference system, the digital conference system allows any station, such as station 10, to elect not to listen to another station, such as station 4, even though station 4 is listening to station 10.

Figure 4:
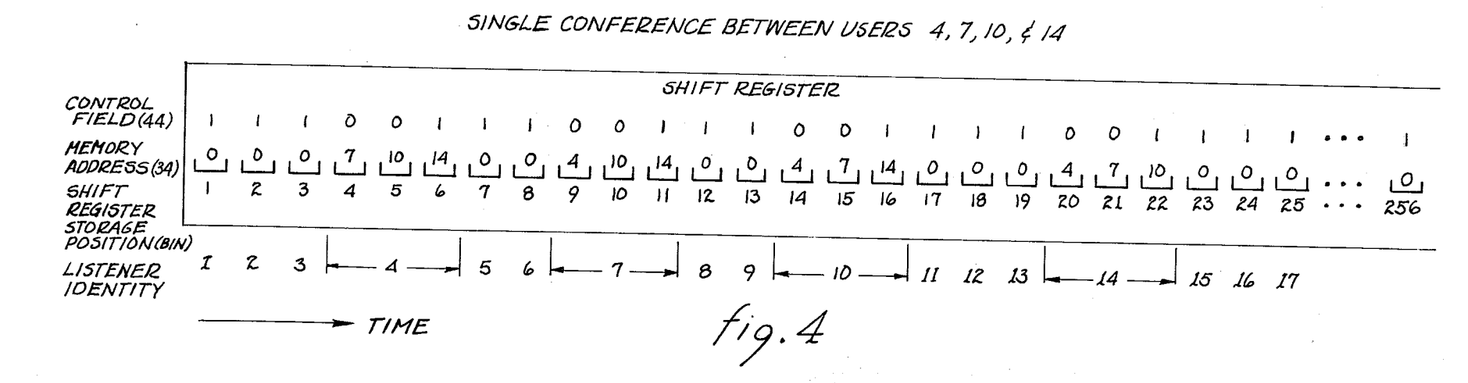
FIG. 4 is a table showing the shift register content for a conference between intercom stations 4, 7, 10, and 14 of the present invention.

All of these conference control signals are routed to microprocessor controller 58 over conference control line 22. Although each input from each intercom station will alter the contents of shift register 32 virtually instantaneously, for simplicity, the shift register contents indicated in FIG. 4 represent the content which is present at the completion of all conference control entries from stations 4, 7, 10 and 14. Upon receiving a conference control signal, a signal is sent over line 61 from controller 58 to switch 54 so that reordered data will be transmitted to shift register 32 over lines 62 and 56. As soon as the structuring of shift register 32 is completed, microprocessor controller 58 takes itself out of the recirculation loop by sending a reset command over line 61 to reset switch 54 so that the shift register content illustrated in FIG. 4 will continue to be recirculated through shift register 32 until a subsequent new conference control signal is received by microprocessor controller 58.

Referring now to FIG. 4, the first horizontal row illustrates the content of control field 44. The second row illustrates the content of the memory address field 34. The content of the memory address field is coupled to RAM 28 in memory means 26 and consists of address locations from 0 to 31 in the RAM. If, for instance, the memory address in a particular shift register storage position is a 7, then RAM 28 will read out the stored digital speaker signal in a storage position 7 on the RAM's output line 64.

The third row of FIG. 4 represents the shift register storage position which is circulating past the output take-off point of shift register 32.

The final row (row 4) corresponds to the identity of the listener who is listening over a headset at some particular designated intercom station. Listener 1 will be located at intercom station 1; listener 2 will be located at intercom station 2; etc.

The speed at which shift register 32 operates is quite high. As a complete circulation of each of the 256 storage bins must be completed within a single 125 microsecond interval, the output of each storage bin is present for only about .5 microseconds.

Assuming now that shift register 32 has been fully loaded for a conference between stations 4, 7, 10, and 14 and that the shift register is presently reading out the digital data stored in shift register storage position 1, FIG. 4 tells us that storage position 1 contains a 0 memory address. This memory address signal of 0 will be coupled to RAM 28 by conductor 36. RAM 28 will then read out the content of its storage position 0 on output lines 64. Since the content of RAM storage location 0 corresponds to the output of speaker 0, which is by designation a 0 reference level signal, digital listener output signal on output lines 64 will be a 0. Since, for example, there is no other participants in any conference on the entire digital conference system other than at stations 4, 7, 10, and 14, this 0 level output signal from RAM 28 tells us that for listener 1 there is no signal to be heard. It is quite possible that there is in fact a listener at intercom station 1 who is wearing a headset, but who is currently not involved in any conference communications and will, therefore, not be hearing any output signal whatsoever.

Shift register storage position 1 also contains a control field data bit of 1. This binary 1 is shift register position 1 indicates that the next subsequent shift register storage position corresponds to the next listener, which in this case is listener No. 2. Another way of saying the same thing is that a binary 1 in the control field indicates that the memory address signal in shift register storage position 1 is at the last output which will be transmitted to listener No. 1. Again, in this case, listener No. 1 receives an output of 0 which is equivalent to not hearing any sound at all.

A binary 1 control bit is present in the control field corresponding to shift register bins 2 and 3 which indicates that listeners 2 and 3 also hear nothing. Shift register bin 4 contains a memory address of 7 and a control bit of 0. The memory address of 7 indicates that RAM 28 should read out the digital signal stored in RAM address location 7 which corresponds to the digital amplitude of the signal sample from speaker 7 at intercom station 7. The control bit of 0 indicates that there is yet more data which is to be received by the present listener which, as can be seen from row 4 of FIG. 4, is listener No. 4. Storage bin 5 contains a memory address of 10 which will route the stored binary signal in RAM 28 address 10 to listener 4 also. Storage bin 6 contains a 14 which will route the stored amplitude from speaker 14 to speaker 4 also. The 1 in the control field indicates that this is the end of the output which is going to be routed to listener No. 4.

The 0 memory address bit in storage bin 7 indicates that listener No. 5 is to hear nothing and the control bit of 1 in storage bin 7 indicates that no other information is to be transmitted to listener No. 5 during this circulation of shift register 32.

As can be seen from FIG. 4, listener No. 4 hears the data samples from speakers 7, 10, and 14. Referring again to line 4, it can be seen that listener No. 7 hears the stored speaker output signals generated by speakers 4, 10, and 14. These three speaker addresses are stored in shift register positions 9, 10, and 11. Listeners 8 and 9 hear a 0 level amplitude, while listener 10 hears the stored speaker output signal from speakers 4, 7, and 14. This last group of speaker address data is stored in shift register storage positions 14, 15, and 16.

Listeners 11, 12, and 13 receive a 0 level speaker signal is as indicated by the 0 memory address located in shift register storage positions 17, 18, and 19. Listener 14 hears the speaker output data from speakers 4, 7, and 10 which addresses are stored in shift register storage positions 20, 21, and 22.

Since this completes all of the necessary communication between intercom stations 4, 7, 10, and 14, all of the remaining shift register storage positions from storage position 23 through position 256 will contain a memory address of 0, indicating that listeners 15 through 31 will be monitoring a 0 level output signal, i.e., will not receive any stored speaker signals and will not receive any communications through their respective headsets.

All of the outputs from memory means 26 are coupled to multiplier 40 by output conductor 64. Although it has not been shown in FIG. 4, a 3-bit attenuation signal which is programmed into the system by each user when he dials up the desired conferences is coupled from shift register 32 to multiplier 40 by conductor 42. Multiplier 40 multiplies each digital listener output pulse from memory means 24 by the preselected attenuation factor in order to control the desired volume at which a particular listener desires to hear a particular speaker.

The attenuated output from multiplier 40 is coupled to accumulator 46, which, in the preferred embodiment, is a 74283 accumulator manufactured by Texas Instruments. Accumulator 46 adds and accumulates the various attenuated listener output pulses produced by multiplier 40. Accumulator 46 accumulates all output signals produced by multiplier 40 until a 1-bit is received on control line 50. When a binary 1 is received by accumulator 46, it generates a single digital signal corresponding to the cumulative amplitude of all digital signals received in the time interval since the last binary 1 control signal. This signal digital output signal from accumulator 46 is referred to as the listener output signal and is coupled by a single 12-bit cable 66 to all of the 31 intercom stations. Only a single intercom station which receives the appropriate listener address signal on the 5-bit listener address cable 68 will be enabled to receive the listener output signal on conductor 66.

When a particular listener monitors a plurality of speakers, for instance in the example given in FIG. 4, listener 4 during a single 125 microsecond sampling interval monitors speakers 7, 10, and 14. Samples from speakers 7, 10, and 14 will not be heard by listener 4 sequentially. These three speaker samples will be sequentially addressed by RAM 28, but will be added and stored in accumulator 46 so that listener 4 will hear speaker samples 7, 10, and 14 added together and not as discrete samples. The output of the accumulator is a single digital signal representing the sum of all of the various speaker samples added together. Even if 30 speakers were speaking while one listener was monitoring them, the output to that particular listener would still be a single digital voltage level. This digital voltage is sent to D/A converter 16 in a designated station. Again, referring to the example of FIG. 4, listener 4 will not get another updated speaker output signal until the recirculating list has completed an additional circulation. This updating occurs once each 125 microseconds so that the D/A converter output pulse is designed to last 125 microseconds to be compatible with the rest of the system. At the input to D/A converter 16 a very short pulse is received. For the 32 station system the duration of this pulse will be on the order of 4 microseconds.

Accumulator 46 is a digital adder having a memory. Whenever it receives binary 1 from the control field, the accumulator memory is cleared so that the succeeding attenuated listener output pulses can be added and stored prior to transmission to a designated listener. In the FIG. 4 example, binary 1 in the control field corresponding to shift register storage position 3 causes the stored content of accumulator 46 (a 0 in this case) to be transmitted to listener 3 and immediately thereafter the memory in accumulator 46 is cleared.

For shift register position number 4, the memory address is a 7. This causes storage position number 7 in RAM 28 to be addressed. The output from address 7 is attenuated by multiplier 40 and directed to accumulator 46 where it is stored. The next memory address signal in shift register 32 is a 10 which causes the RAM content in position 10 to be transmitted to accumulator 46 where it is added to the listener pulse received from RAM position 7. After the same sequence has been done for listener 14, the control field binary 1 bit in shift register position 6 causes accumulator 46 to generate a single cumulative output for listener 4.

The digital listener output from accumulator 46 is sent over the 12 wire cable 66 to all intercom stations. The only listener who actually hears this particular listener output signal is listener 4. Each of the other intercom stations has an address other than 4 and is therefore not enabled during this particular time interval by the listener address signal of "4". Although intercom station 4 will be enabled during shift register storage positions 4, 5, and 6, no output will be actually transmitted over the listener output line 66 to intercom station 4 until the control bit of 1 is produced during shift register storage position 6 which activates accumulator 46 to generate the summed output signal representative of the total cumulative amplitude coming from speakers 7, 10, and 14.

The listener address signal which activates enable circuit 12 in each station is generated by counter 48. Every time a binary 1 appears in the control field, counter 48 is incremented one count. At the end of each circulation of shift register 32, the content of counter 48 is reset to zero. The listener output pulse read from RAM 28 by the memory address signal in shift register position 1 is always sent to listener 1 since counter 48 is always at a count of 1 at this time. In the example of FIG. 4, the binary 1 in the control field increments counter 48 one count to a count of 2 and directs the next listener output pulse to listener 2. This technique eliminates the need for a separate listener address field in shift register 32 as the sequentially incremented output from counter 48 performs this function. The listener address signal is merely an enable signal which allows the D/A converter at a particular listener station to receive the listener output signal present on the 12-bit listener output line 66.

In an alternative embodiment, a listener address field could be provided in shift register 32. There would then be no need for entries in the shift register for those stations which would otherwise receive the zero reference levels. Data would not pass over listener output (line) 66 nor would it be accumulated by accumulator 46 when a listener is receiving the zero reference level. This technique offers a significant economic savings in a system with a large number of stations where most stations are inactive, such as a conventional telephone system.

The capacity of any time division multiplexed system (such as multiplier 40, accumulator 46, and listener output 66) is directly proportional to the speed of the equipment. If the speed doubles, then capacity doubles (from 200 stations with presently available logic circuits to 400 users) with no additional hardware in the time shared devices. Similarly, elimination of inefficiencies (such as the time slots for inactive stations) will increase capacity.

Eight attenuation levels are provided in this embodiment. Alternatively, 7 attenuation levels could have been used and the eighth attenuation level could represent an infinite attenuation factor so that the 32-bit RAM 28 could have been used to accommodate 32 different listeners as opposed to utilizing all 8 attenuation levels and 1 of the 32 storage positions to indicate a zero reference level.

Microprocessor controller 58 loads the address, attenuation and control fields as the shift register recirculates. All 256 storage locations in the shift register must be cycled by the microprocessor controller to completely load the shift register properly. The conferencing process does not have to be stopped to load the list. Shift registers 32 cycles through the old list and at the appropriate points the new list is read in from microprocessor 58 to expand or decrease the number of conferences maintained by the system. The updated list is loaded as the system operates.

Figure 5:
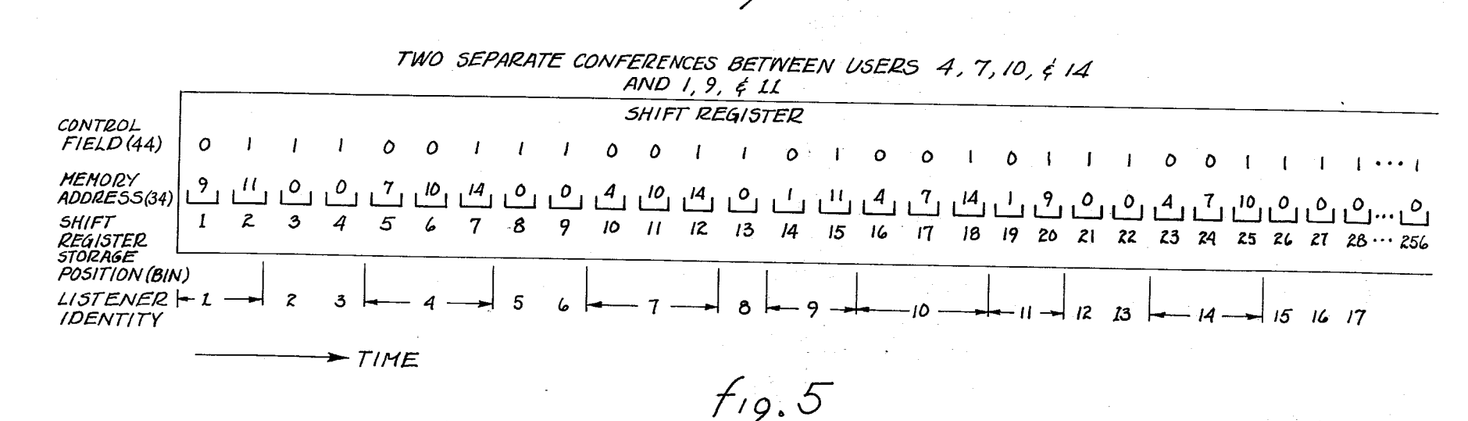
FIG. 5 is a table showing the shift register content for two separate conferences between intercom stations 4, 7, 10, and 14 and 1, 9, and 11 of the present invention.

FIG. 5 illustrates the reordering process which must be accomplished by microprocessor controller 58 when the existing conference between stations 4, 7, 10, and 14 illustrated in FIG. 4 is modified to include an additional conference between users 1, 9, and 11. As can be seen from a careful study of FIG. 5, the contents of shift register 32 must be completely reconstructed; it is not possible to merely add memory address, attenuation, and control data to the unused shift register storage positions beyond position 22 to include the additional conference between users 1, 9, and 11. FIG. 5 shows that these two separate conferences, shift register storage positions 1 and 2 access memory address positions 9 and 11 which are appropriately attenuated by multiplier 40 and summed and accumulated in accumulator 46. Just as shift register storage position 2 is shifted, the control field bit of 1 causes accumulator 46 to generate a summed listener output signal which is transmitted on listener output conductor 66 to all 31 intercom stations. Counter 48 contains a count of 1 which is transmitted on the single listener address line 68 so that intercom station number 1 is enabled to receive the summed listener output signal which corresponds to the speaker output signals generated at intercom stations 9 and 11. Again, since listeners 2 and 3 are not involved in a conference they each receive a 0 level output signal from the 0 address location in RAM 28.

Line 4 of FIG. 5 illustrates that the listener output signals are routed sequentially to listeners 1, 2, 3, - - -, 31 in ascending numerical order. This particular relationship will always hold true no matter how many different intercom stations are involved in conferences. Because of this characteristic, microprocessor controller 58 must restructure the contents of shift register 32 any time even a single element of any conference is altered.

Each of the 31 listeners in this particular embodiment receives at least one listener output signal even though it may only be a 0 level signal. Only a single shift register storage position is required for a station which is receiving a 0 amplitude level signal. For those intercom stations which are actively involved in a conference, no more than the absolute minimum of shift register storage positions is dedicated to transferring speaker output signals to any particular listener. Not a single shift register storage position is wasted. This maximum utilization of the shift register storage positions is referred to as "packing" and allows a vastly expanded capacity for this digital conference system as compared with any other prior art system. It also allows a great degree of flexibility in that with a shift register having a length of 256 storage position, conferences can be maintained between very large numbers of quite diverse groups of intercom stations without overloading the capacity of the shift register.

Packing also allows other special features to be implemented in this digital conference system without signficantly impairing the other features which are inherent in the system. For instance, the system has a broadcast mode which is particularly useful in airborne installations where the aircraft commander can activate the broadcast mode and simultaneously transmit to all intercom stations at any desired amplitude.

Furthermore, since in most conference systems there are certain nets between particular intercom stations which are very frequently activated, control panel 20 in each intercom station can be utilized to instruct microprocessor controller 58 to activate one of several preselected nets which are stored internally in controller 58. Thus it might be possible for an operator to push a single button and instantaneously activate a 10 station conference. Special programs such as this net feature and broadcast function can be readily programmed into a digital computer like microprocessor controller 58 and can be altered or expanded as requirements dictate.

An additional function which can be performed by this digital conference system is allowing a listener who is involved in a conference to monitor another speaker outside of the conference. For instance, if listener 4 in the conference described in FIG. 4 desired to monitor speaker 30, he could do this at any time. Furthermore, intercom station 4 could monitor speaker 30 at any desired amplitude level. For instance, in the airborne application, the operator at intercom station 4 might choose to continuously monitor the radio transmissions from an airborne intercepter pilot at all times at a relatively low volume level.

At this system is a totally digital conference system there is no problem with crosstalk between various cables connecting the intercom stations which might allow one operator to hear undesired signals emanating from other intercom stations. Additionally, the digital construction of this conference system allows it to be readily implemented in large scale integrated circuits while the prior art analog devices cannot be so manufactured.

An additional advantage of this digital conference system is that all of the processing equipment is centrally located. Each of the individual intercom systems is basically quite simple, very lightweight and physically quite small.

The amount of cabling which must be connected between the central processor and each of the 31 remote units is also minimized. Listener output cable 66, listener address cable 68, conference control cable 22 and speaker output cable 8 can all be combined in a single multiplexed cable consisting of no more than 4 wires routed from the central processor to each of the 31 remote stations. This single cable, which carried all required digital data in a multiplexed format, is connected in parallel with all of the remote stations. This particular feature is especially crucial for airborne applications where space and weight constraints can be extremely severe. Since all of the most complicated electronic components are located in the central processor, the repair and replacement of the unit and the troubleshooting thereof is made substantially easier. This potentially great reduction in maintenance costs can be directly translated into customer desirability and cost savings.

Although the preferred embodiment was discussed in terms of a 31 station conference system, it is clear that only very simple hardware changes are required to expand its capacity to 200 users or even more as the level of technology in the digital field increases. To expand the capacity of this system, the speed and capacity of sequential sampler 24 and random access memory 28 would have to be increased. A possible alternative to a shift register in the list processor 30 would be to use a sequential counter in combination with a random access memory to perform a function virtually identical to that performed by shift register 32. This change in design and operation is readily apparent to those skilled in the art.

As a security measure, a speech scrambler can be readily implemented into this digital conference system. All of the various intercommunications could be thus made highly secure and it would be virtually impossible for an unauthorized party to successfully wiretap the interconnecting cables running between the various intercom stations.

It will be apparent to those skilled in the art that the disclosed digital conference system may be modified in numerous ways and may assume various embodiments other than that preferred embodiment specifically set out and described above. Accordingly, it is intended by the appended claims to cover all such modifications of the invention which fall within the true spirit and the scope of the invention.

What is claimed is:

1. A digital conference system for providing conference conversations among selected groups of stations in a communications system, said system comprising in combination:

a. a plurality of stations for generating speaker signals and for generating conference control signals, each of said stations responsive to a listener address signal for receiving selected groups of listener output signals;

b. programmable list processor means connected to receive said conference control signals and responsive thereto for generating memory address signals and control signals;

c. memory means connected to receive said speaker signals and for sequentially storing and periodically updating samples of said speaker signals, said memory means also connected to receive said memory address signals and responsive thereto for generating a series of listener output pulses;

d. accumulator means coupled to said memory means and responsive to said control signals for accumulating selected groups of listener output pulses and for generating corresponding groups of listener output signals; and e. listener address means responsive to said control signals for generating the listener address signals;

whereby, said corresponding listener output signals received by a station are representative of the desired conference conversation to be heard at said station.

2. The system of claim 1 wherein each of said plurality of stations includes:

a. an analog to digital converter for converting an audio input signal from a speaker to a digital speaker signal; and b. a digital to analog converter for converting selected groups of digital listener output signals into an analog output signal for transmission to a listener.

3. The system of claim 2 wherein each of said stations includes a control means for generating said conference control signals.

4. The system of claim 3 wherein each of said plurality of stations further includes circuit means responsive to a predetermined listener address signal for transmitting selected groups of listener output signals to said digital to analog converter.

5. The system of claim 1 wherein said memory means includes:

a. sampling means for sequentially sampling said speaker signals; and b. random access memory means for storing and periodically updating samples of said speaker signals received from said sampling means and for generating a series conference control signals for rearranging the data content of said recirculating shift register in accordance with a predetermined encoding scheme upon receiving an updated conference control signal.

6. The system of claim 1 wherein said programmable list processor means includes:

a. a recirculating shift register for generating said memory address signal and said control signals; and b. processor means responsive to said conference control signals for rearranging the data content of said recirculating shift register in accordance with a predetermined encoding scheme upon receiving an updated conference control signal.

7. The system of claim 1 wherein said listener address means includes a counter which is incremented to the next higher count each time a control signal having a binary 1 level is received.

8. A digital conference system for providing conference conversations among selected groups of stations in a communications system, said system comprising in combination:

a. a plurality of stations for generating speaker signals and for generating conference control signals, each of said stations responsive to a listener address signal for receiving selected groups of listener output signals;

b. programmable list processor means connected to receive said conference control signals and responsive thereto for generating memory address signals and control signals and including attenuator means for generating an attenuation signal;

c. memory means connected to receive said speaker signals and for sequentially storing and periodically updating samples of said speaker signals, said memory means also connected to receive said memory address signals and responsive thereto for generating a series of listener output pulses;

d. multiplier means coupled to said memory means and being responsive to said attenuation signal for generating attenuated listener output pulses;

e. accumulator means coupled to said multiplier means and responsive to said control signals for accumulating selected groups of attenuated listener output pulses and for generating said listener output signals; and f. listener address means responsive to said control signals for generating said listener address signal;

whereby, selected groups of said listener output signals received by a station are representative of the desired conference conversation to be heard at said station and the amplitude of each conference conversation being monitored by an operator at said station can be controlled by said operator.

9. A digital conference system for providing conference conversations among selected groups of stations in a communications system, said system comprising in combination:

a. a plurality of stations for generating digital speaker signals and for generating conference control signals, each of said stations responsive to a listener address signal for receiving selected groups of a listener output signal, each of said plurality of stations including:

1. an analog to digital converter for converting an analog input signal from a speaker to said digital speaker signals;

2. a digital to analog converter for converting selected groups of said digital listener signals into an analog output signal for transmission to a listener; and 3. control means for generating said conference control signals;

b. programmable list processor means connected to receive said conference control signals and responsive thereto for generating memory address signals and control signals, said programmable list processor means including:

1. a recirculating shift register for generating said memory address signals and said control signals; and 2. a processor means responsive to said conference control signals for rearranging the data content of said shift register in accordance with a predetermined encoding scheme upon receiving an updated conference control signal;

c. memory means connected to receive said digital speaker signals and for sequentially storing and periodically updating samples of said digital speaker signals, said memory means also connected to receive said memory address signals and responsive thereto for generating a series of listener output pulses; said memory means including:

1. sampling means for sequentially sampling said digital speaker signals; and 2. random access memory means for storing and periodically updating samples of said digital speaker signals received from said sampling means and for generating a series of listener output pulses in response to said memory address signals;

d. accumulator means coupled to said memory means and responsive to said control signals for accumulating selected groups of said listener output pulses and for generating said listener output signals; and e. listener address means responsive to said control signals for generating said listener address signals;

whereby, the selected groups of listener output signals received by a station are representative of the desired conference conversation to be heard at said station.

10. The system of claim 9 wherein said listener address means includes a counter which is incremented to the next count each time a control signal having a binary 1 level is received.

11. The system of claim 10 wherein said programmable list processor means includes attenuator means for generating an attenuation signal, and wherein said system includes multiplier means coupled to said memory means and to said accumulator means, said multiplier means being responsive to said attentuation signal for generating attenuated listener output pulses; whereby the amplitude of each conference conversation being monitored by an operator at a station can be controlled by said operator.

12. A method for providing conference conversations among selected groups of stations in a communication system, said method comprising the steps of:

a. generating conference control signals designating which ones of a plurality of stations are to be received by a particular station;

b. transmitting the conference control signals to a processor means;

c. generating speaker signals representing the words spoken by an operator at each of said plurality of stations;

d. transmitting said speaker signals to said processor means;

e. generating a recirculating train of memory address signals and conference control signals in repetitive frames in response to said conference control signals;

f. sequentially storing and periodically updating once during each frame samples of said speaker signals;

g. generating a listener output pulse in response to each memory address signal;

h. accumulating selected groups of listener output pulses and generating a train of listener output signals in response to said control signals, each listener output signal being representative of a desired conference conversation to be heard at a predetermined station;

i. generating a listener address signal in response to said control signals for designating a predetermined station to receive each listener output signal;

j. transmitting said listener output signals and said listener address signals to said plurality of stations; and k. receiving selected listener output signals at predetermined stations in response to said listener address signals;

whereby, the listener output signals received by a predetermined station are representative of the desired conference conversation to be heard at said station.

13. The method of claim 12 wherein the steps of transmitting said speaker signals to said process or means and receiving selected listener output signals at predetermined stations in response to listener address signals occur simultaneously.

14. The method of claim 13 further including the steps of:

a. converting an analog signal representing the words spoken by an operator at each of said plurality of stations to said speaker signals; and b. converting selected listener output signals received at a predetermined station in response to said listener address signal into an analog output signal.

* * * * *

UNITED STATES PATENT OFFICE
CERTIFICATE OF CORRECTION

Patent No. 4,059,735          Dated November 22, 1977

Inventor(s) William L. Betts

It is certified that error appears in the above-identified patent and that said Letters Patent are hereby corrected as shown below:

Column 11,

Line 60, delete "At" and insert -- As --.

Column 13,

Line 42, delete "conference control signals for rearranging the data content of said recirculating shift register in accordance with a predetermined encoding scheme upon receiving an updated conference control signal", and instead insert -- of listener output pulses in response to said memory address signals --.

UNITED STATES PATENT OFFICE
CERTIFICATE OF CORRECTION

Patent No. 4,059,735　　　　Dated November 22, 1977

Inventor(s) William L. Betts

It is certified that error appears in the above-identified patent and that said Letters Patent are hereby corrected as shown below:

Column 16,

Line 30, delete "process or" and insert -- processor --.

Signed and Sealed this

Fourth Day of April 1978

[SEAL]

Attest:

RUTH C. MASON
Attesting Officer

LUTRELLE F. PARKER
Acting Commissioner of Patents and Trademarks